(12) United States Patent
Matlin et al.

(10) Patent No.: US 8,028,942 B2
(45) Date of Patent: Oct. 4, 2011

(54) BIN FULL DETECTION WITH LIGHT INTENSITY SENSING

(75) Inventors: Tai Hoon Kim Matlin, Round Lake Beach, IL (US); Michael D. Jensen, Wood Dale, IL (US); Jakub M. Krynski, Buffalo Grove, IL (US)

(73) Assignee: Fellowes, Inc., Itasca, IL (US)

( * ) Notice: Subject to any disclaimer, the term of this patent is extended or adjusted under 35 U.S.C. 154(b) by 214 days.

(21) Appl. No.: 12/184,631

(22) Filed: Aug. 1, 2008

(65) Prior Publication Data
US 2010/0025509 A1 Feb. 4, 2010

(51) Int. Cl.
*B02C 25/00* (2006.01)
(52) U.S. Cl. ........ 241/100; 241/36; 241/101.3; 241/236
(58) Field of Classification Search .................. 241/100, 241/236, 101.3, 36
See application file for complete search history.

(56) References Cited

U.S. PATENT DOCUMENTS

| | | | |
|---|---|---|---|
| 2,899,140 A | 8/1959 | Hellyer | |
| 3,882,770 A | 5/1975 | Bleasdale | |
| 4,650,128 A | 3/1987 | Goldhammer | |
| 5,102,057 A | 4/1992 | Ellis, III | |
| 5,167,374 A | 12/1992 | Strohmeyer | |
| 5,310,229 A | 5/1994 | Hanson | |
| 5,318,229 A | 6/1994 | Brown | |
| 5,375,701 A | 12/1994 | Hustad et al. | |
| 5,375,781 A | 12/1994 | Schwelling | |
| 5,464,162 A | 11/1995 | Kusters | |
| 5,772,130 A | 6/1998 | Toschi | |
| 5,897,065 A | 4/1999 | Schwelling | |
| 5,934,504 A | 8/1999 | Elliott | |
| 5,934,584 A | 8/1999 | Schwelling | |
| 5,969,310 A | 10/1999 | Schwelling | |
| 6,116,528 A | 9/2000 | Schwelling | |
| 6,978,954 B2 | 12/2005 | Kroger et al. | |
| 7,040,559 B2 | 5/2006 | Matlin et al. | |

(Continued)

FOREIGN PATENT DOCUMENTS

DE 10032069 2/2002

(Continued)

OTHER PUBLICATIONS

Multi-Touch Sensing through LED Matrix Displays—Using an LED display bidirectionally to optically detect finger touches, from Internet website page http://web.archive.org.web/20060612230503/ mrl.nyu,edu~jhan/ledtouch/index.html, Aug. 4, 2008, 1 page.

(Continued)

*Primary Examiner* — Mark Rosenbaum
(74) *Attorney, Agent, or Firm* — Pillsbury Winthrop Shaw Pittman LLP

(57) ABSTRACT

An assembly has a bin level detection system having at least one sensor positioned to receive radiation reflected off any material deposited in a bin and to determine an intensity of the reflected radiation. The intensity corresponds to an amount or level of shredded material deposited in the bin. The system may detect radiation from one or more emitters, or, alternatively, detect ambient light entering the bin via a window. A level indicator system may also be provided to indicate the amount of material deposited in the bin, including if the bin is full. The assembly may comprise a shredder and a shredder housing.

40 Claims, 12 Drawing Sheets

U.S. PATENT DOCUMENTS

| | | | |
|---|---|---|---|
| 7,204,441 | B1 | 4/2007 | Hartnett et al. |
| 2009/0218425 | A1* | 9/2009 | Sued et al. ............ 241/36 |
| 2010/0181400 | A1 | 7/2010 | Davis et al. |

FOREIGN PATENT DOCUMENTS

| | | |
|---|---|---|
| GB | 2215236 A | 9/1989 |
| JP | 2303550 | 12/1990 |
| JP | H2-303550 A | 12/1990 |
| JP | 8309217 | 11/1996 |
| JP | 2002085994 | 3/2002 |
| JP | 2005095898 | 4/2005 |
| JP | 2005131581 | 5/2005 |
| WO | 8606982 | 12/1986 |

OTHER PUBLICATIONS

Just DYI Project Log, from Internet website page http://projects.dimension-x.net/technology-and-projects/ledsensors, Aug. 4, 2008, 3 pages.

Motestruments!—LED Touch Sensor; from Internet website page http://web.archive.org/web/20060604000250/http:motestruments.com/led-touch-sensor-cir . ., Aug. 4, 2008, 3 pages.

Dietz et al., "Very Low-Cost Sensing and Communication Using Bidirectional LEDs", Mitsubishi Electric Research Laboratories, Jul. 2003, http://www.merl.com, 19 pages.

Dhananjay V. Gadre et al., LED Senses and Displays Ambient Light Intensity, Sep. 14, 2006, 3 pages.

* cited by examiner

BIN FULL DETECTION WITH LIGHT INTENSITY SENSING

BACKGROUND

1. Field of Invention

The present invention is generally related to an assembly with a bin for receiving materials, such as a shredder. In particular, the apparatus comprises a bin level detection system for determining an amount of material deposited in the bin using reflected radiation.

2. Description of Related Art

Shredders are well known devices for shredding or destroying articles such as paper, CDs, DVDs, credit cards, and the like. An example of such a shredder may be found, for example, in U.S. Pat. No. 7,040,559, which is herein incorporated by reference in its entirety.

A common type of shredder has a shredder mechanism including a series of cutter elements contained within a shredder housing that is removably mounted atop a container. The shredded articles are fed into an input opening and discharged downwardly through a discharge opening into the container.

Conventional full bin indicators for shredder apparatuses typically include an electronic component in order to detect and/or alert a user that the bin is full. One such device utilizes an infrared signal that recognizes the accumulation of bin contents when a beam is interrupted. Another device involves a mechanical flap that actuates an electronic switch when the bin has reached capacity.

Because of the generally smaller detector and emitter/transmitter area, full bin indicators having electronic components including beams may have problems. For example, systems using beams are prone to dust and static malfunctions. Dust may collect on the emitter or transmitter head and may eventually cause the machine to malfunction and falsely trigger a signal for a bin full of shredded articles. Stray shredded articles could also attach themselves to the transmitter or detector due to static charges that may build up inside the shredder and trigger a similar condition. Alternately, mechanical bin full systems may have issues with shredded articles building up on or around the switch thereby causing "bird-nesting" of shredded materials below the cutters.

SUMMARY

A bin level detection system sensing light intensity in accordance with one or more embodiments of the present invention provides a cost-effective way of alerting a user when a shredder bin is nearing or has substantially reached its capacity for holding shredded particles.

One aspect of the invention provides an assembly including a bin for receiving material and a bin level detection system. The bin level detection system has at least one sensor positioned to receive radiation reflected off any material deposited in the bin and determine an intensity of the reflected radiation. The intensity detected by the at least one sensor corresponds to an amount of material deposited in the bin.

In an embodiment, the assembly comprises a shredder having a shredder housing having a shredder mechanism mounted therein. The shredder housing is provided on the bin and includes an input opening for receiving materials to be shredded and an output opening for depositing shredded material into the bin.

Another aspect of the invention provides a method for operating a shredder. The shredder has a bin for receiving shredded material and a shredder housing having a shredder mechanism mounted therein. The shredder housing is provided on the bin and includes an input opening for receiving material to be shredded and an output opening for depositing shredded material into the bin. A bin level detection system is also provided with the shredder and has at least one sensor positioned to receive radiation reflected off any shredded material deposited in the bin. The method includes: detecting the reflected radiation with the sensor and determining an intensity of the reflected radiation. The intensity detected by the sensor corresponds to an amount of shredded material deposited in the bin.

Yet another aspect of the invention provides a bin level detection system for a shredder. The shredder includes a shredder housing having a shredder mechanism mounted therein, as well as an input opening on an upper side for receiving materials to be shredded and an output opening on a lower side for depositing shredded material into a bin. The bin level detection system includes a plurality of sensors positioned on the lower side of the shredder housing to emit and detect radiation such that the radiation that is emitted is reflected off any shredded materials deposited in the bin. The plurality of sensors receives the radiation reflected off any shredded material to determine an intensity of the reflected radiation. The intensity corresponds to an amount of shredded material deposited in the bin. The system also includes a level indicator system provided on the shredder housing to indicate to a user of the shredder the amount of shredded material deposited in the bin.

Other objects, features, and advantages of the present invention will become apparent from the following detailed description, the accompanying drawings, and the appended claims.

DETAILED DESCRIPTION OF THE PREFERRED EMBODIMENT(S)

The following embodiments are described with reference to the drawings and are not to be limiting in their scope in any manner.

Figure 1:
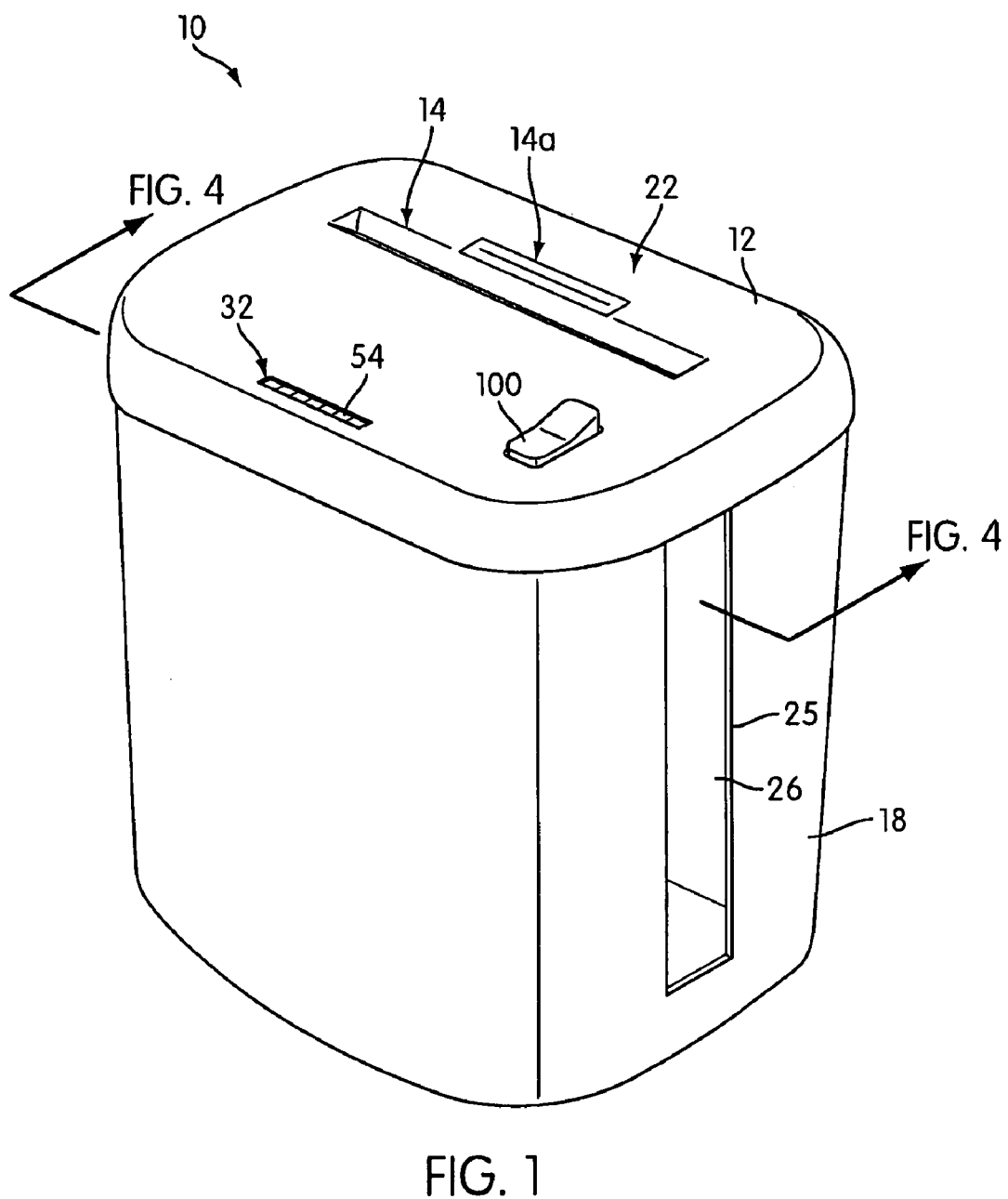
FIG. 1 is a top perspective view of a shredder apparatus constructed in accordance with an embodiment of the present invention.

FIG. 1 shows a view of a shredder apparatus 10 constructed in accordance with an embodiment of the present invention. The shredder 10 is designed to destroy or shred articles such as paper, paper products, CDs, DVDs, credit cards, and other objects. In an embodiment, the shredder 10 may comprise wheels (not shown) to assist in moving the shredder 10. The shredder 10 comprises a shredder housing 12 that sits on top of a container 18, for example. The shredder housing 12 comprises at least one input opening 14 on an upper side 22 (or upper wall or top side or top wall) of the housing 12 for receiving materials to be shredded. The input opening 14 extends in a lateral direction, and it also often referred to as a throat. The input opening or throat 14 may extend generally parallel to and above a shredder mechanism 20 (described below). The input opening or throat 14 may be relatively narrow, so as to prevent overly thick items, such as large stacks of documents, from being fed into therein. However, the throat 14 may have any configuration. In an embodiment, an additional or second input opening 14a may be provided in shredder housing 12. For example, input opening 14 may be provided to receive paper, paper products, and other items, while second input opening 14a may be provided to receive objects such as CDs and DVDs. Shredder housing 12 also comprises an output opening 16 on a lower side 24 (or bottom side or bottom wall or underside or bin side). Generally speaking, the shredder 10 may have any suitable construction or configuration and the illustrated embodiments provided herein are not intended to be limiting in any way. In addition, the term "shredder" or "shredder apparatus," used interchangeably throughout this specification, are not intended to the limited to devices that literally "shred" documents and articles, but instead intended to cover any device that destroys documents and articles in a manner that leaves such documents and articles illegible and/or useless.

The shredder 10 also comprises a shredder mechanism 20 (shown generally in FIG. 2) in the shredder housing 12. When articles are inserted into the at least one input opening or throat 14, 14a, they are directed toward and into shredder mechanism 20. "Shredder mechanism" is a generic structural term to denote a device that destroys articles using at least one cutter element. Destroying may be done in any particular way. Shredder mechanism 20 may include a drive system (not shown) with at least one motor, such as an electrically powered motor, and a plurality of cutter elements 21. The cutter elements 21 are mounted on a pair of parallel mounting shafts (not shown). The motor operates using electrical power to rotatably drive first and second rotatable shafts of the shredder mechanism 20 and their corresponding cutter elements 21 through a conventional transmission (not shown) so that the cutter elements 21 shred or destroy materials or articles fed therein, and, subsequently, deposit the shredded materials into opening 19 of container 18 via the output opening 16. The shredder mechanism 20 may also include a sub-frame for mounting the shafts, motor, and transmission. The drive system may have any number of motors and may include one or more transmissions. Also, the plurality of cutter elements 21 are mounted on the first and second rotatable, parallel shafts in any suitable manner. For example, in an embodiment, the cutter elements 21 are rotated in an interleaving relationship for shredding paper sheets and other articles fed therein. In an embodiment, the cutter elements 21 may be provided in a stacked relationship. Furthermore, other devices such as a cooling fan (not shown) for cooling the motor or one or more vents 36 for releasing heated air therethrough used in cooperation with the shredder mechanism 20 may be provided in or on shredder housing 12. The operation and construction of such a shredder mechanism 20 is well known and need not be discussed herein in detail. As such, the at least one input opening or throat 14 is configured to receive materials inserted therein to feed such materials through the shredder mechanism 20 and to deposit or eject the shredded materials through output opening 16.

Figure 2:
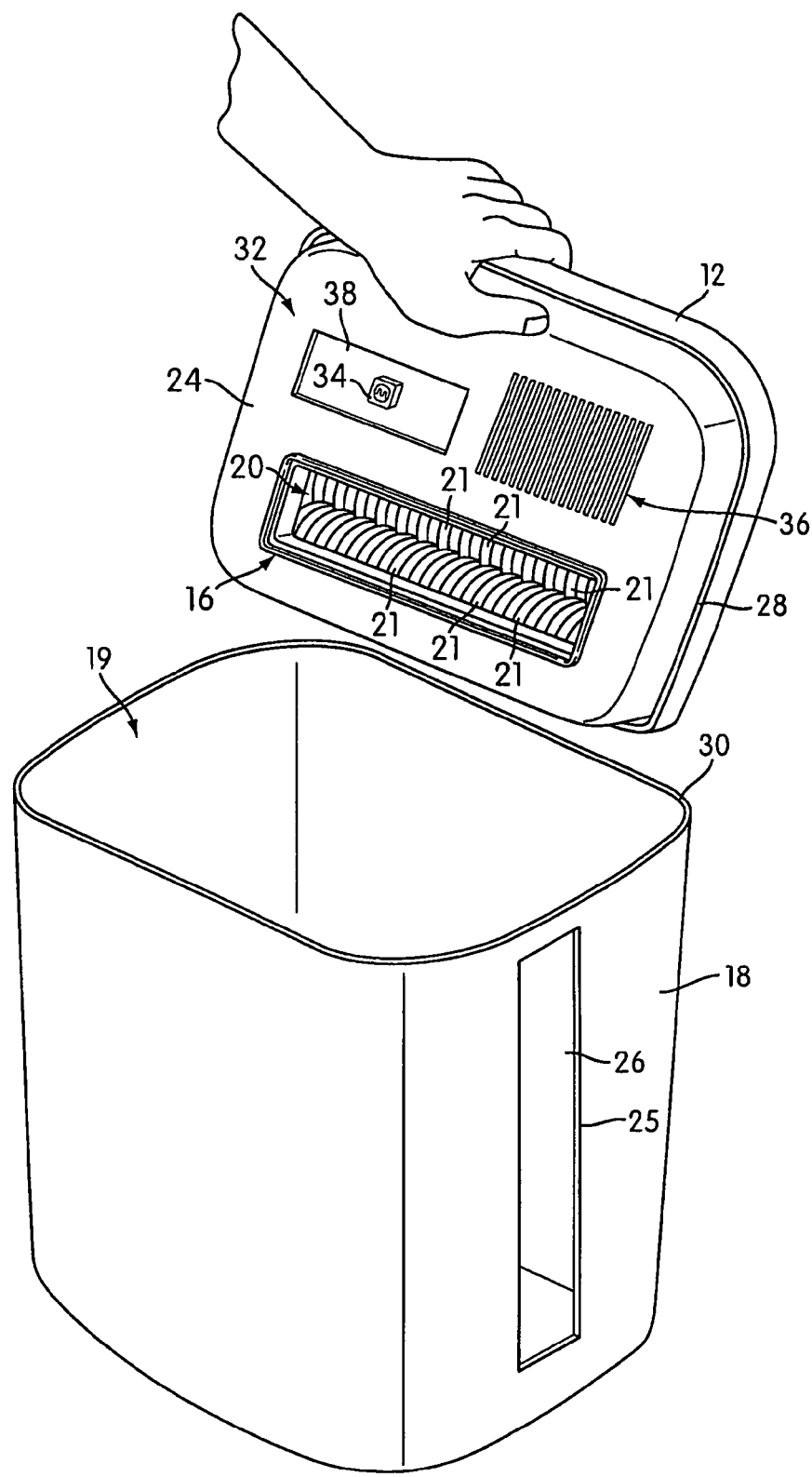
FIG. 2 is a detailed perspective view of a lower side of a shredder housing of the shredder apparatus of FIG. 1 with a bin level detection system for detecting ambient light in accordance with an embodiment of the present invention.

Shredder housing 12 is configured to be seated above or upon the container 18. As shown in FIG. 2, shredder housing 12 may comprise a detachable paper shredder mechanism. That is, in an embodiment, the shredder housing 12 may be removed in relation to the container 18 to ease or assist in emptying the container 18 of shredded materials. In an embodiment, shredder housing 12 comprises a lip 28 or other structural arrangement that corresponds in size and shape with a top edge 30 of the container 18. However, a complementary fit is not a requirement of the present invention. The container 18 receives paper or articles that are shredded by the shredder 10 within its opening 19. More specifically, after inserting materials into input opening 14 for shredding by cutter elements 21, the shredded materials or articles are deposited from the output opening 16 on the lower side 24 of the shredder housing 12 into the opening 19 of container 18. The container 18 may be a waste bin, for example.

Alternatively, in an embodiment, the shredder housing 12 and bin 18 may be an integral component. For example, shredded materials may be removed via a door (not shown) located on the container 18 and/or the shredder housing 12. In an embodiment, the container 18 may be positioned in a frame beneath the shredder housing 12. For example, the frame may be used to support the shredder housing 12 as well as comprise a container receiving space so that the container 18 may be removed therefrom. For example, in an embodiment, a container 18 may be provided to slide like a drawer with respect to a frame, be hingedly mounted to a frame, or comprise a step or pedal device to assist in pulling or removing it therefrom. Container 18 may comprise an opening or recess (not shown) to facilitate a user's ability to grasp the bin, and thus provide an area for the user to easily grasp to separate the container 18 from the shredder housing 12, thereby providing access to shredded materials. The container 18 may be substantially or entirely removed from being in an operative condition with shredder housing 12 in order to empty shredded materials such as chips or strips (i.e., waste or trash) located therein. In an embodiment, the container or bin 18 may comprise one or more access openings (not shown) to allow for the deposit of articles therein.

At least one window 26 may be provided in one or more walls of the container 18. In an embodiment, the window 26 may be substantially translucent or transparent or, alternatively, comprise a through opening 25. The at least one window 26 permits ambient light constituting radiation to enter the bin 18. Window 26 may also allow a user to view the contents within the container 18. As shown in the embodiment of FIG. 1, the opening 25 or window 26 may be provided substantially along the length of a side of the container 18 so as to permit light to be directed into and toward the container's bottom 19a. The larger surface area of the opening 25 or window 26 allows ambient light to enter from a plurality of directions, even if a part of it is substantially blocked by shredded materials, for example. As further described with reference to FIGS. 4 and 5, the radiation received through window 26 is reflected off of any shredded material or particles deposited within the bin 18 and detected by a bin level detection system 32 to determine an amount or level of shredded material deposited therein.

Generally it should be noted that the terms "container," "waste bin," and "bin" are defined as devices for receiving shredded materials discharged from the output opening 16 of the shredder mechanism 20, and such terms are used interchangeably throughout this specification. However, such terms should not be limiting. Container or bin 18 may have any suitable construction or configuration.

Typically, the power supply to the shredder 10 will be a standard power cord with a plug (not shown) on its end that plugs into a standard AC outlet. Also, a control panel may be provided for use with the shredder 10. Generally, the use of a control panel is known in the art. As shown in FIG. 1, a power switch 100 or a plurality of switches may be provided to control operation of the shredder 10. The power switch 100 may be provided on the upper side 22 of the shredder housing 12, for example, or anywhere else on the shredder 10. Movement of the manually engageable portion of switch 100 moves the switch module between states. Switches are generally known in the art and will not be described in detail herein. The switch 100 includes a switch module (not shown) that connects the motor to the power supply. This connection may be direct or indirect, such as via a controller. The term "controller" is used to define a device or microcontroller having a central processing unit (CPU) and input/output devices that are used to monitor parameters from devices that at operatively coupled to the controller. As is generally known in the art, the controller may optionally include any number of storage media such as memory or storage for monitoring or controlling the sensors coupled to the controller. As described in the embodiment of FIG. 10 below, the controller may be used selectively enable the operation of the shredder mechanism 20 based on the detection of the presence of at least one article (e.g., paper) in the throat 14 by an activation sensor 60 and/or the amount or level of shredded materials in the bin 18.

Generally, the construction and operation of the switch 100 and controller for controlling the motor are well known and any construction for these may be used. For example, a touch screen switch, membrane switch, or toggle switch are other examples of switches that may be used. Switch 100 may be a sliding switch, a rotary switch, or a rocker switch. Also, the switch 100 may be of the push switch type that is simply depressed to cycle the controller through a plurality of conditions. Also, the switch may have distinct positions corresponding to on/off/idle/reverse, and these conditions may be states selected in the controller by the operation of the switch. Any of the conditions (e.g., power on, idle, power off) could also be signaled by lights, on a display screen such as an LCD screen, or otherwise.

Figure 3:
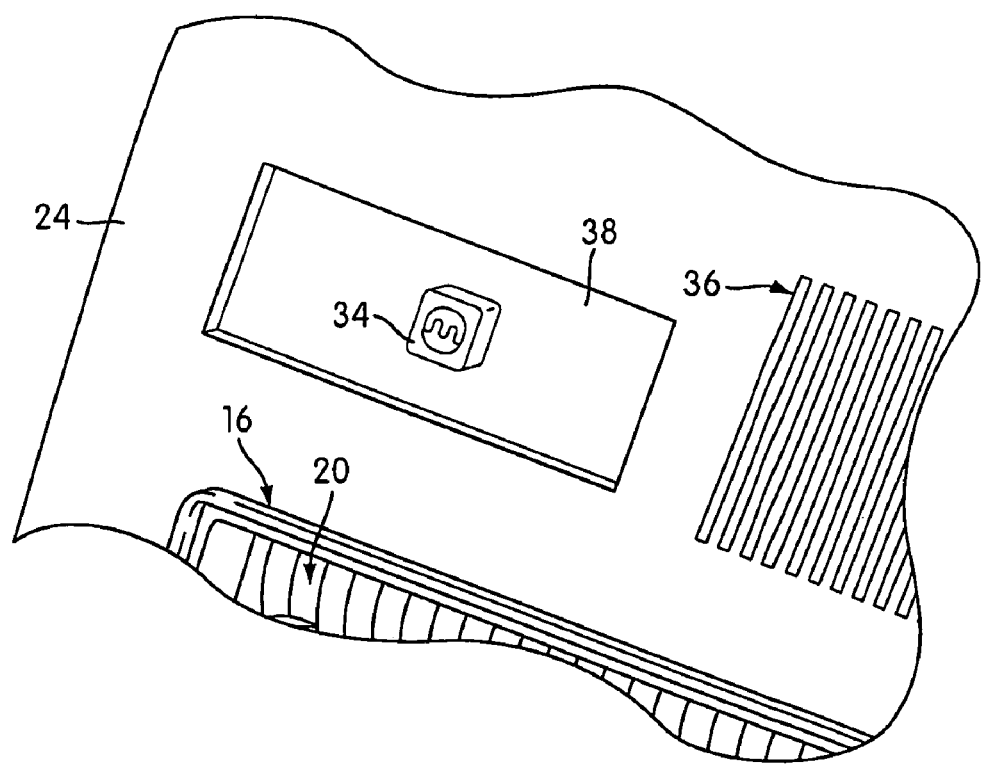
FIG. 3 is a detailed view of a sensor of the bin level detection system in accordance with an embodiment of the present invention.

Shredder 10 also includes a bin level detection system 32. In an embodiment, bin level detection system 32 comprises at least one sensor 34 positioned to receive radiation reflected off any shredded material deposited in the bin. As shown in FIG. 2 and in detail in FIG. 3, the sensor 34 may be provided within the shredder housing 12. Specifically, the at least one sensor 34 may be mounted within at least one opening or area in the lower side 26 of the shredder housing 12. The at least one sensor 34 is covered or enclosed via sensor window 38 located in the at least one opening or area in the lower side 26 of the housing 12. The sensor window 38 may comprise a translucent or transparent member for allowing reflected radiation to pass therethrough while still preventing the inclusion of dust and particles discharged from the shredder mechanism 20 via output opening 16 and into the opening or area adjacent the sensor 34. In some embodiments, the at least one sensor 34 may be provided on a lower side 26 or bottom wall of the shredder housing 12, and may protrude slightly therefrom. Nonetheless, the area for and method of mounting the sensor 34 should not be limiting.

The at least one sensor 34 is configured to determine an intensity of the reflected radiation it receives. The intensity of the reflected radiation received by the sensor 34 corresponds to an amount of shredded material deposited in the bin 18. The sensor 34 may be any type of sensor for detecting intensity of reflected radiation. One known example of this type of sensor may include, but should not be limited to, photodetectors or photoconductors.

Figure 4:
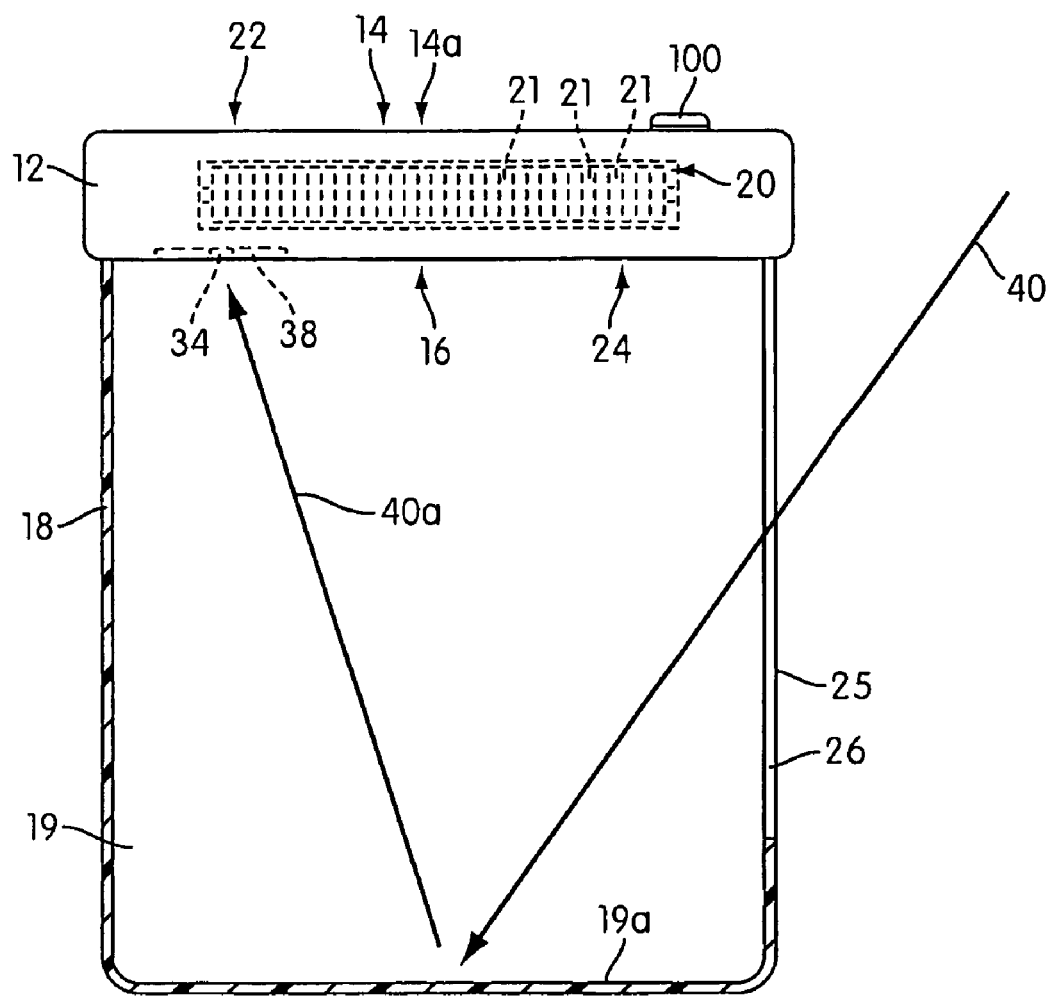
FIG. 4 is a cross-sectional view of the shredder of FIG. 1 illustrating the detection of ambient light in accordance with an embodiment of the present invention.
Figure 5:
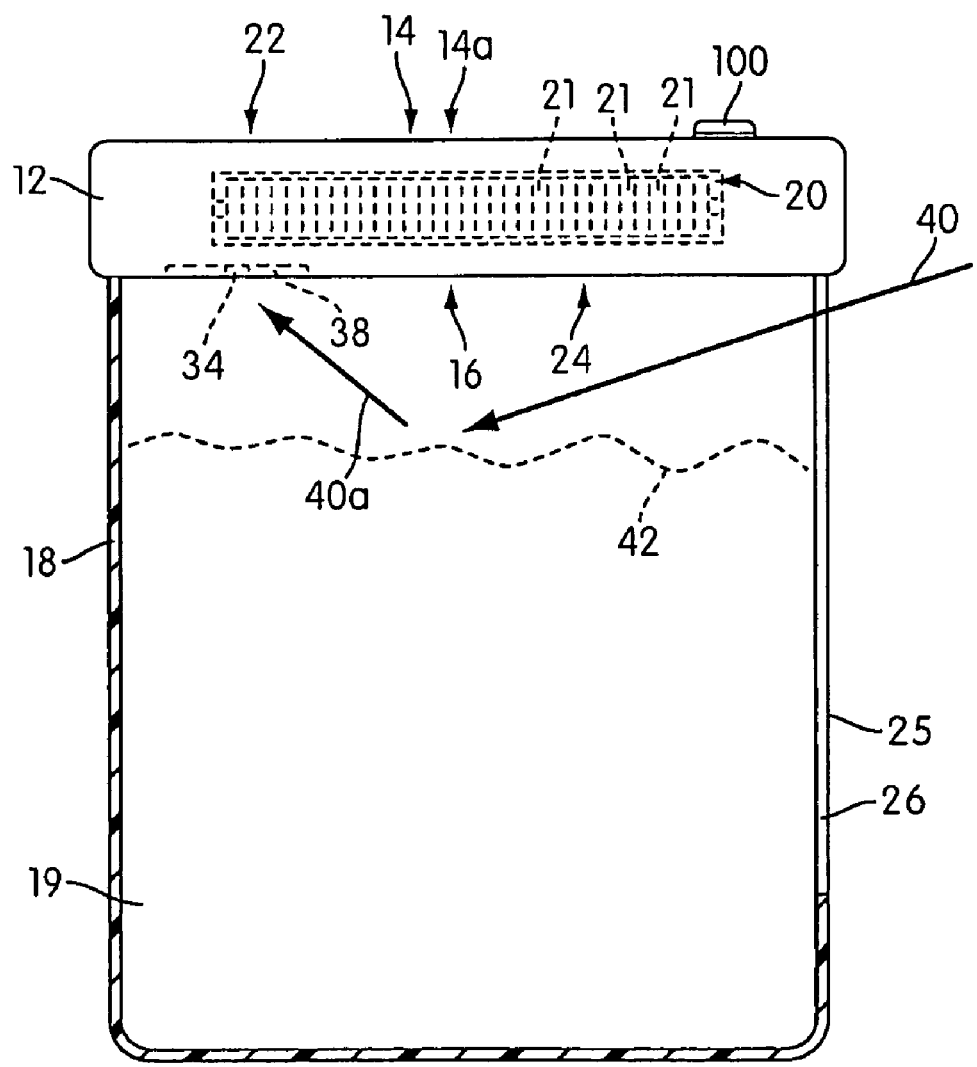
FIG. 5 is a cross-sectional view of the shredder of FIG. 1 illustrating the detection of shredded particles therein using ambient light in accordance with an embodiment of the present invention.

The bin level detection system 32 of FIG. 2 is used for detecting ambient light received through opening 25 or window 26. FIGS. 4 and 5 illustrate cross-sectional views of the shredder 10 of FIG. 1 showing the method of using the bin level detection system 32 to detect ambient radiation or light 40 entering the bin 18 in accordance with an embodiment of the present invention. When the shredder housing 12 is atop the bin 18 and the bin 18 is empty, as shown in FIG. 4, ambient light 40 may enter through opening 25 or window 26. Ambient light 40 is deflected off of the bottom 19a of the container 18 and the reflected radiation 40a is received by sensor 34. The bin level detection system 32 then detects the reflected radiation 40a with the sensor 34, and determines an intensity of the reflected radiation 40a.

As the bin 18 becomes full of shredded paper 42 and/or other materials, the contents will pile on the bottom 19a of the container 18 and begin filling it. The ambient radiation or light 40 enters through opening 25 or window 26 and is deflected off of substantially the top of the shredded materials 42, as shown in FIG. 5. The reflected radiation 40a is then received by the at least one sensor 34. Again, the bin level detection system 32 then detects the reflected radiation 40a using at least one sensor 34, and determines an intensity of the reflected radiation 40a.

As previously noted, the intensity of the reflected radiation received by the sensor 34 corresponds to an amount of shredded material deposited in the bin 18. In some embodiments, the shredder 10 may use any sort of circuitry, software, logic, or a combination thereof to determine the intensity readings of the reflected radiation. For example, in an embodiment, the controller comprises logic which determines any change in the detected level of intensity of the ambient light 40. Thus, if a decrease or an increase in intensity of the ambient light 40 is determined, an increase or a decrease in the amount of shredded materials in the bin 18 is detected. For example, when using photodetectors as sensors 34 to receive reflected radiation 40a of ambient light 40, a change in intensity is indirectly proportional to the amount of shredded materials in the bin. Specifically, a decrease in the intensity of the reflected radiation corresponds to an increase in the amount of shredded material deposited in the bin. In contrast, as shown in FIG. 5, an increase in the intensity of the reflected radiation corresponds to a decrease in the amount of shredded material deposited in the bin.

Figure 6:
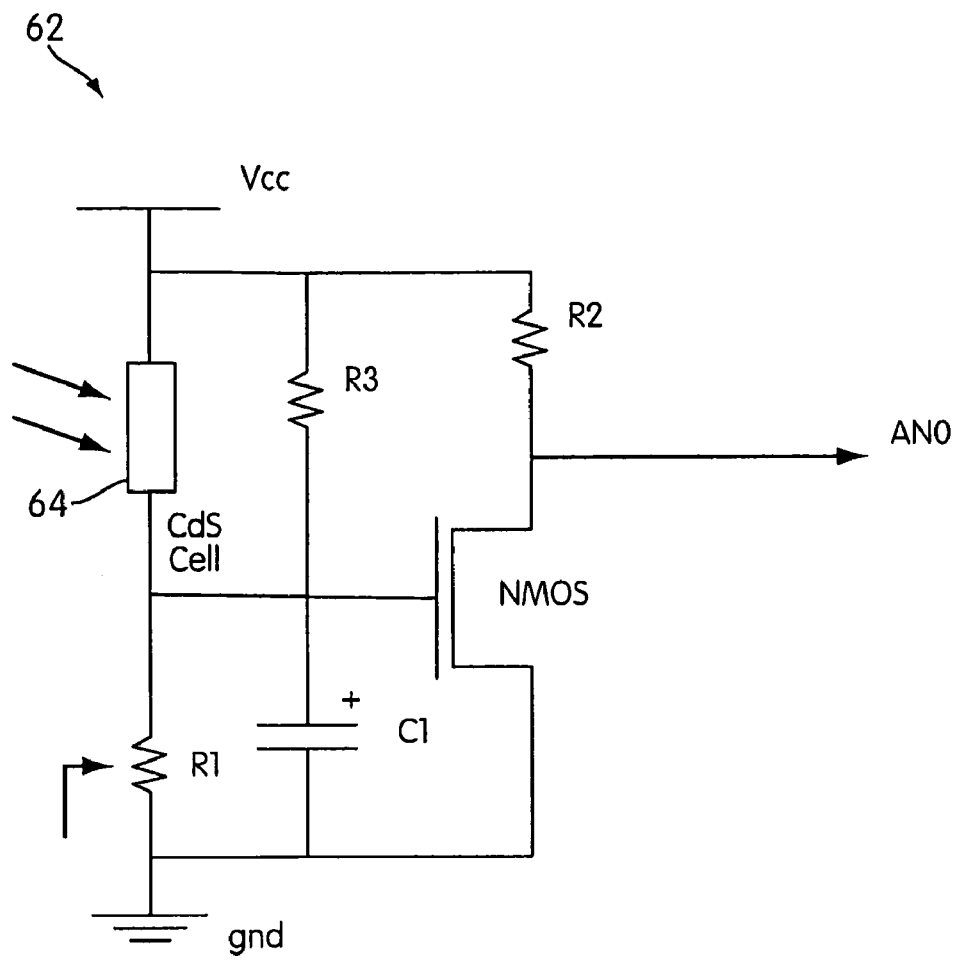
FIG. 6 shows a circuit used to detect ambient light as shown in FIGS. 4 and 5 in accordance with an embodiment of the present invention.

For example, the bin detection system 32 may comprise an ambient light level detection circuit 62 as illustrated in FIG. 6. The circuit 62 may comprise one or more light sensitive elements such as CdS cell 64 for sensing the reflected radiation 40a or light beams of ambient light 40. The CdS cell 64 is provided in a voltage divider circuit connected to resister R1 between voltage supply Vcc and circuit ground. The circuit 62 may also comprise an amplifier circuit for detecting small changes in voltage across resistor R1. As shown in FIG. 6, the amplifier circuit may be implemented in common source configuration with an n-channel metal-oxide-semiconductor field-effect transistor (NMOS) and resistor R2. The CdS cell is a light sensitive resistor; thus, if the intensity of the reflected radiation 40a of ambient light 40 is detected as being low or decreasing, the resistance of the CdS cell 64 will be high as compared to the resistance of the resistor R2. The voltage at the junction of the CdS cell 64 and resistor R1 will increase with increasing light intensity. On the other hand, if the intensity of the reflected radiation 40a increases, the resistance of the CdS cell 64 becomes relatively low as compared to the resistance value of the resistor R1, and the voltage at their junction will decrease with decreasing light intensity. Since the junction of the CdS Cell 64 and resistor R1 lie on the same node as the gate of the NMOS and the junction of resistor R3 and capacitor C1, the voltage across all the aforementioned junctions will be the same. In low light situation the CdS cell 64 will have a high resistance which will induce a very small voltage across R1, not enough to turn on the NMOS. In the instant situation, the output AN0 of the amplifier will be at a high voltage level as determined by the value of resistor R2. However, as the intensity of the reflected radiation increases the resistance of the CdS cell 64, it causes a rise in the voltage across resistor R1, turning on the NMOS. As the voltage at the gate of the NMOS increases it causes a reciprocal effect on the AN0 voltage.

In order to ensure that sudden fluctuations in light intensity do not trigger the detection circuit 62, a stabilizing capacitor C1 may be used at the gate of the NMOS to prevent rapid fluctuations in gate voltage. As shown in FIG. 6, a resistor R3 may also be implemented in a current divider configuration in conjunction with the CdS cell 64 to adjust the resistance of the voltage divider between the CdS cell 64 and resistor R1.

In addition, the controller may use logic and calculations to compensate for shadows, changes in lighting, or other known events that may occur that may affect the amount of ambient light 40 received through opening 25 or window 26 and that is reflected and/or detected by the at least one sensor 34.

Referring back to FIG. 1, the bin level detection system 32 may comprise a level indicator system 54. Level indicator system 54 may include any number of devices for alerting the user that the bin 18 is nearly or substantially full of shredded materials. For example, any number of audible signals, visual signals, or a combination thereof may be used as indication devices. An example of a visual signal may be provided in the form of a red warning light, which may be emitted from an LED, for example. Level indicator system 54 may be provided on the upper side 22 of the shredder housing 12 to indicate to a user of the shredder 10 the amount of shredded material deposited in the bin 18.

In the embodiment shown in FIG. 1, the level indicator system 54 is a progressive indication system comprising a plurality of lights which correspond to the amount of shredded material in the bin 18. For example, the progressive indication system may comprise a series of indicators in the form of lights to indicate the accumulation or level of shredded materials such as 42 in the bin 18. The system 54 may include a green light, a plurality of yellow lights, and a red light. The green light may indicate that the bin 18 is substantially empty. The yellow lights could provide a progressive indication of the amount of shredded materials accumulating in the bin 18. The red light may be used at the end of the sequence of lights to indicate that the capacity of bin 18 is substantially full. In some embodiments, a plurality of lights (in any color) could be used to progressively indicate the amount of shredded materials in the bin 18. In an embodiment, the level indicator system 54 may be provided on a screen such as a digital or LCD screen. In some embodiments, letters or words such as "BIN FULL" may be shown as indicators. Other visual indicators such as a bar graph that increases as the amount of shredded materials in the bin increases, or a "fuel gauge," i.e., a dial with a pivoting needle moving progressively between zero and maximum desired amount of shredded materials in the bin, may also be used. Alternatively, other ways of getting a user's attention may be used, such as flashing one or more of the lights in the sequence, to indicate that the bin 18 is substantially full.

In an embodiment, audible signals may be used with the level indicator system 54. Examples of audible signals include, but are not limited to, beeping, buzzing, and/or any other type of signal that will audibly alert the user that the bin 18 is substantially full of shredded materials. Similarly, the aforementioned indicators of the progressive indicator system may be in the form of audible signals, rather than visual signals or lights. For example, like the yellow lights described above, several types of audible signals may be used to indicate the amount of materials in the bin. For example, when a user inserts an article into the throat 14 of the shredder 10, an audible signal may be heard to indicate the level or amount of shredded materials in the bin 18. The level indicator system 54 may provide audible signals in the form of spoken words such as "bin full." Any of the above noted audible signals gives the user the opportunity to remove shredded materials or particles from the inside 19 of the bin 18.

The above noted audible and visible alert features of the level indicator system 54 may be used in lieu of or in conjunction with cutting off power to the shredder mechanism 20 upon detecting that the bin full level has been substantially reached or exceeded. In addition, the level indicator system 54 may be used in cooperation with one or more activation sensors 60, as described below with respect to FIG. 10. However, it should be noted that in some embodiments the level indicator system 54 need not be provided on the housing 12 (e.g., as shown in the illustration of the shredder of FIG. 10), and/or may be provided on any number of places on the shredder 10, or not provided at all.

Though the embodiment in FIGS. 1-5 describes the at least one sensor 34 receiving radiation in the form of ambient light 40, the type of radiation received by the at least one sensor 34 should not be limiting. For example, in an embodiment, the radiation received by one or more sensors may include light in the visible spectrum, infrared radiation, and/or ultraviolet radiation. Such forms of radiation may be provided by internal emitters in the container 18, for example.

Figure 7:
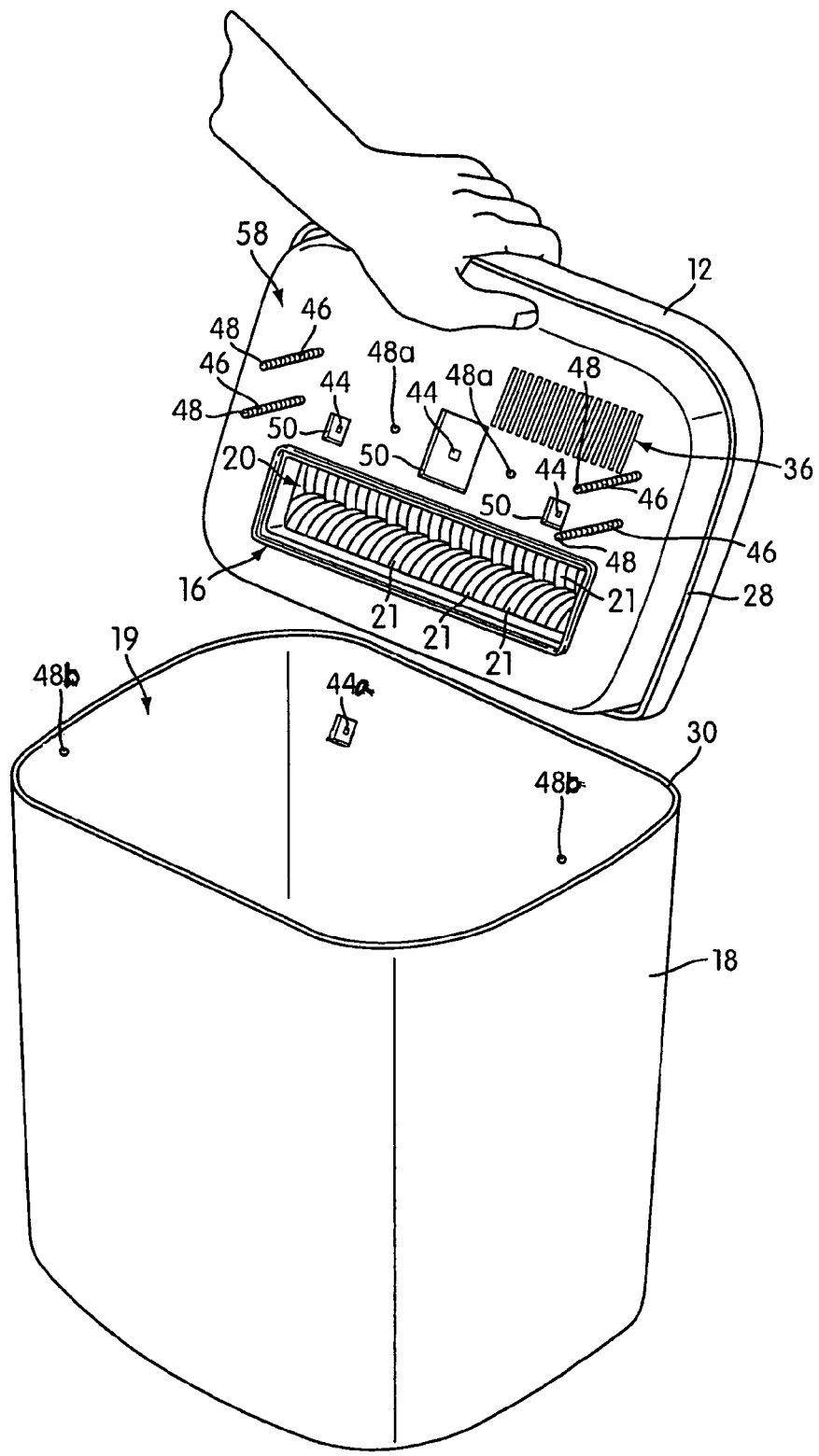
FIG. 7 is a detailed perspective view of a lower side of a shredder housing of a shredder apparatus with a bin level detection system for detecting emitted light in accordance with an embodiment of the present invention.

FIG. 7 illustrates a bin level detection system 58 for detecting emitted light in accordance with an embodiment of the present invention. As shown, the system 58 comprises at least one emitter 48 positioned to emit the radiation downwardly into the bin 18. The system 58 also comprises at least one receiver 44 to receive the radiation reflected off any shredded material deposited in the bin. In some embodiments, as shown in FIG. 7, a plurality of receivers 44 and a plurality of emitters 48 are mounted on the bottom wall of the lower side 26 of the shredder housing 12. The plurality of receivers 44 and/or plurality of emitters 48 may be arranged in a spaced apart relation. The radiation emitted by the at least one emitter 48 may include light in the visible spectrum, infrared radiation, and/or ultraviolet radiation. Similarly, the radiation received by the at least one receiver 44 may include light in the visible spectrum, infrared radiation, and/or ultraviolet radiation.

In some embodiments, the one or more emitters mounted to the lower side 26 of housing 12 are flush with the bottom wall of the lower side 26, as indicated by 48a. In some embodiments, one or more emitters 48 are provided on structures 46 extending downwardly from the bottom wall or lower side 26. In an embodiment, the structures 46 extending downwardly from the bottom wall comprise springs or other resilient structures.

In a similar manner to the sensor 34 as shown in FIG. 2, the one or more receivers 44 may be provided within the shredder housing 12. Specifically, in an embodiment, the one or more receivers 44 may be mounted within at least one opening or area in the lower side 26 of the shredder housing 12. The one or more receivers 44 are covered or enclosed via sensor window 50 located in the one or more openings or areas in the lower side 26 of the housing 12 for receiving the receivers 44. The sensor window 50 may comprise a translucent or transparent member for allowing reflected radiation to pass therethrough while still preventing the inclusion of dust and particles discharged from the shredder mechanism 20 via output opening 16 and into the opening or area adjacent the receivers 44. In some embodiments, the one or more receivers 44 may be provided on a lower side 26 or bottom wall of the shredder housing 12, and may protrude slightly therefrom. Also, in an embodiment, one or more receivers 44 may be provided on one or more side walls of the container 18, such as near lip 30, for example. An example of the mounting of such a receiver 44 is represented in FIG. 7 by receiver 44a. Nonetheless, it should be noted that the area for and method of mounting the receivers 44, 44a should not be limiting.

Alternatively, the emitters 48 may be mounted on one or more side walls of the container 18 or in any other manner so as to emit radiation into the container 18, as represented by sensors 48b in FIG. 7. The mounting location of the emitters 48, 48a, and/or 48b should not be limiting.

The one or more receivers 44 are configured to determine an intensity of the received reflected radiation from the one or more emitters 48. The intensity of the reflected radiation received by a receiver 44 corresponds to an amount of shredded material deposited in the bin 18. The receivers 44 may be any type of sensor for detecting intensity of reflected radiation. One known example of this type of sensor may include, but should not be limited to, photodetectors or photoconductors.

Figure 8:
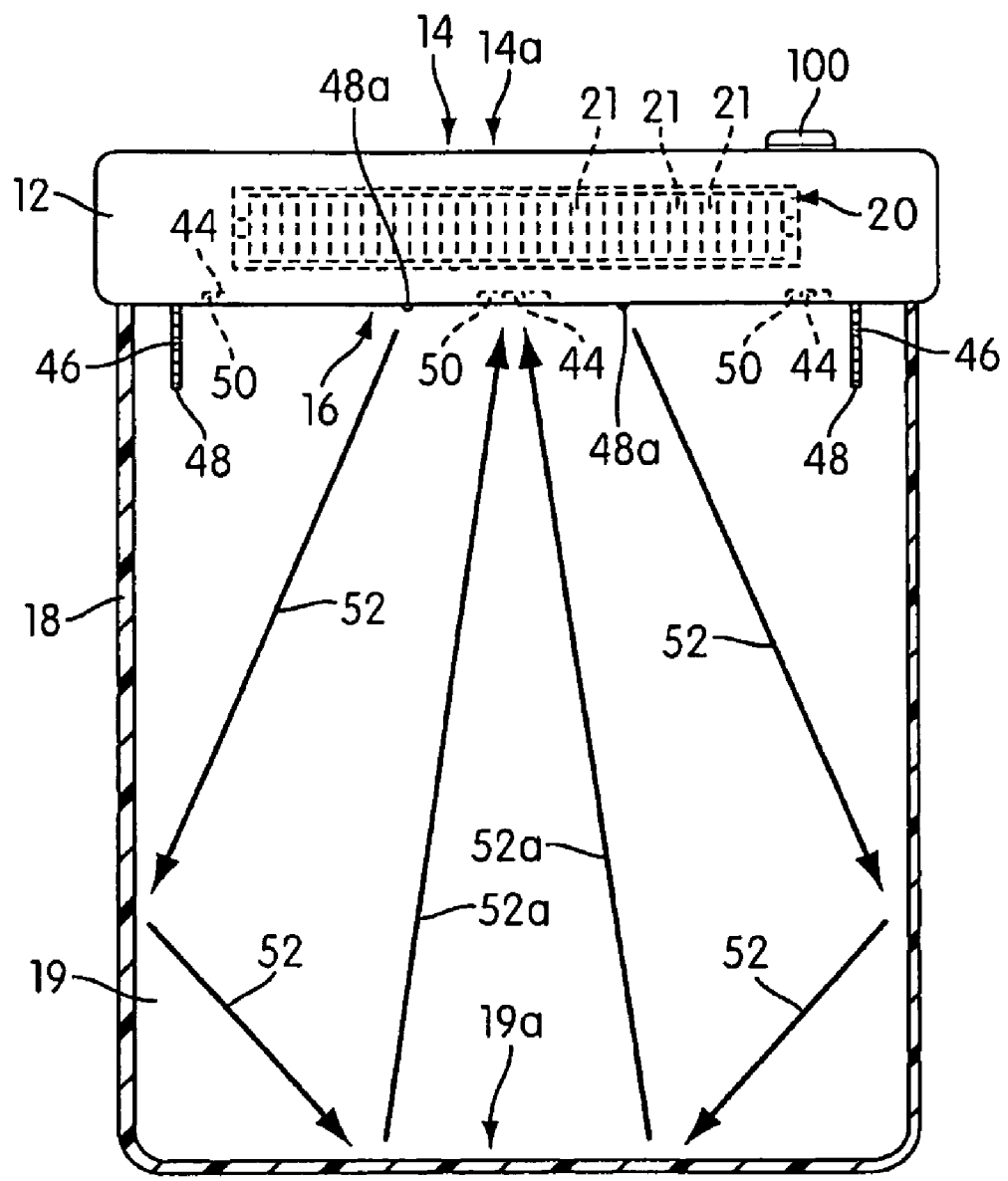
FIG. 8 is a cross-sectional view of the shredder of FIG. 7 illustrating the detection of emitted light in accordance with an embodiment of the present invention.
Figure 9:
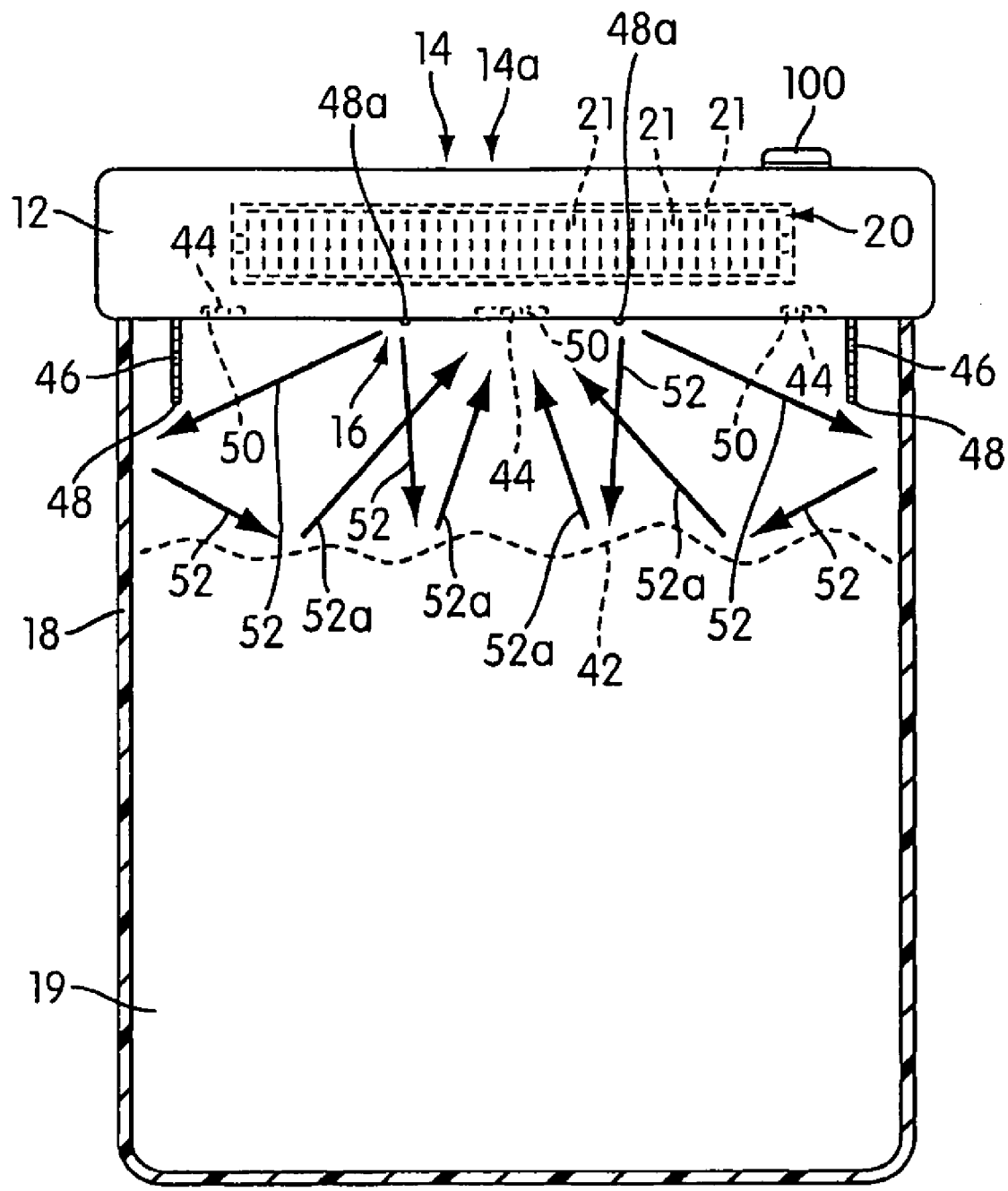
FIG. 9 is a cross-sectional view of the shredder of FIG. 7 illustrating the detection of shredded particles therein using emitted light in accordance with an embodiment of the present invention.

The bin level detection system 58 of FIG. 7 is used for detecting emitted light from emitters 48. FIGS. 8 and 9 illustrate cross-sectional views of the shredder 10 showing the method of using the bin level detection system 58 to detect emitted radiation 52 directed downwardly into the bin 18 in accordance with an embodiment of the present invention. When the shredder housing 12 is atop the bin 18 and the bin 18 is empty, as shown in FIG. 8, emitted light 52 from the one or more emitters 48 may be directed toward the bottom 19a of the bin 18. Emitted light 52 may be deflected off of the sides and/or bottom 19a of the container 18 and the reflected radiation 52a is received by receivers 44. The bin level detection system 58 then detects the reflected radiation 52a with the receivers 44, and determines an intensity of the reflected radiation 52a.

As the bin 18 becomes full of shredded paper 42 and/or other materials, the contents will pile on the bottom 19a of the container 18 and begin filling it. The emitted radiation 52 or light is directed downwardly into the bin 18 and is deflected off of substantially the top of the shredded materials 42, as shown in FIG. 9. The reflected radiation 52a is then received by the at least one receiver 44. Again, the bin level detection system 58 then detects the reflected radiation 52a using at least one receiver 44, and determines an intensity of the reflected radiation 52a.

As noted above, the intensity of the reflected radiation received by the receivers 44 corresponds to an amount of shredded material deposited in the bin 18. The receivers 44 and emitters 48 of the bin level detection system 58 may use any sort of circuitry, software, logic, or combination thereof to determine the intensity readings of the reflected radiation in a similar manner as described above (e.g., indirectly proportional). In some embodiments, the emitters 48 of the system 58 may comprise LEDs.

When using emitted light, such as emitters 48, the receivers 44 can detect the presence or absence of shredded materials in the bin 18 in a similar manner as described above. However, the circuitry and/or logic to determine the intensity readings of the reflected radiation of emitted light may, in some embodiments, act in a different manner. Specifically, the change in intensity of emitted light may be directly proportional to the amount of shredded materials in the bin. That is, if a decrease or an increase in intensity is determined, a decrease or an increase, respectively, in the amount of shredded materials in the bin 18 is detected. Specifically, when using emitting and receiving sensing devices 48 and 44, a decrease in the intensity of the reflected radiation 52a of the emitted light 52 corresponds to a decrease in the amount of shredded material deposited in the bin. In contrast, an increase in the intensity of the reflected radiation detected by the LEDs corresponds to an increase in the amount of shredded material deposited in the bin. For example, as shown in FIG. 9, as the emitted light 52 from the emitters 48 is reflected off of the shredded material 42, the intensity of the reflected light 52a increases, thus indicating an increase in the amount of shredded material in the bin 18. However, the emitters 48 and receivers 44 may alternately determine the amount of shredded materials in an indirectly proportional manner in relation to the intensity of the reflected radiation, as described above with reference to FIGS. 4 and 5.

Figure 11:
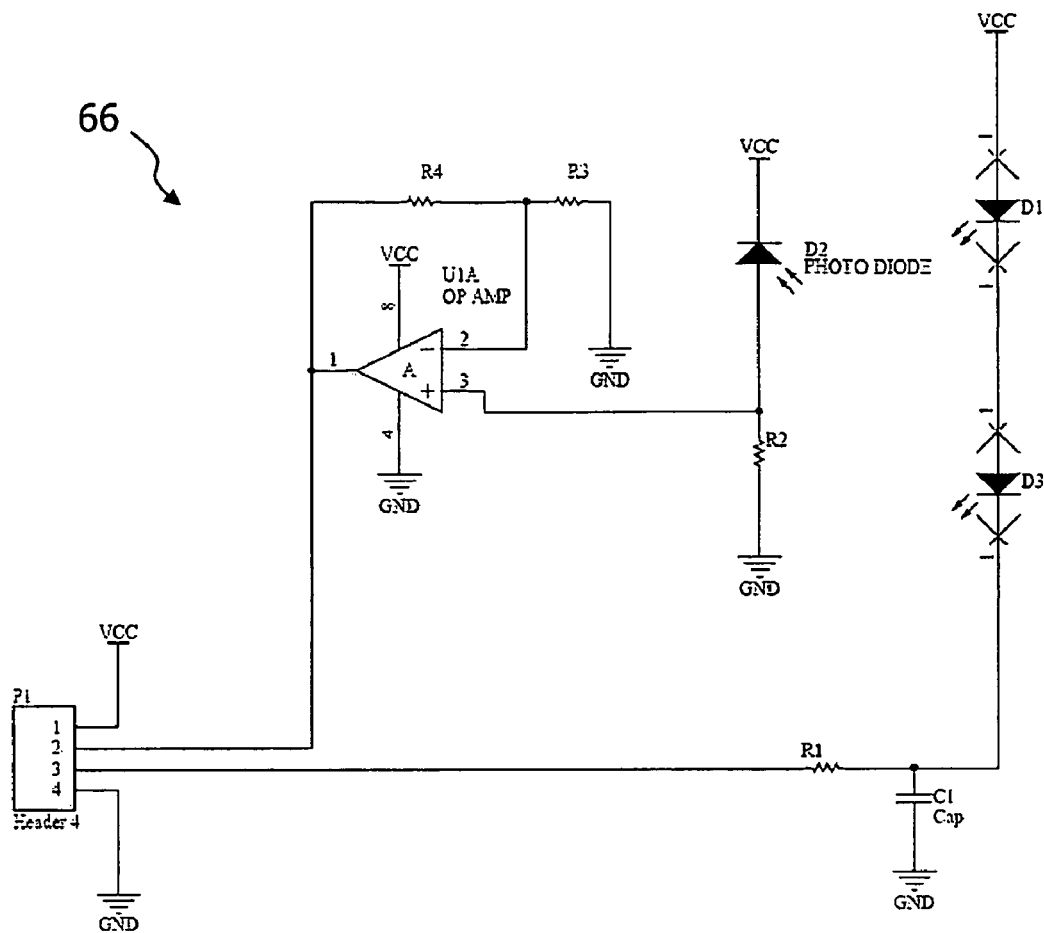
FIG. 11 shows a circuit which may be used to detect emitted light using an emitter and receiver as shown in FIGS. 8 and 9 in accordance with an embodiment of the present invention.

For example, the bin detection system 32 may comprise an emitted radiation level detection circuit 66 as illustrated in FIG. 11. The circuit 66 may comprise LEDs D1 and D3 which act as an optional light sources or emitters such as emitters 48, 48a, or 48b. Reflected light or radiation is received by the sensor D2 and produces a current. As the intensity of the radiation increases, the current increases as well. As this current flows through resistor R2, a voltage is produced. The voltage produced is directly proportional to the current (as light increases, current increases, thus, voltage increases). In this particular embodiment, the voltage produced across resistor R2 is amplified by the amplifier U1. The illustrated amplifier section is not required; however, the amplifier section of circuit 66 may be used to achieve a more optimal signal. Resistors R3 and R4 are used to set the gain of the amplifier U1. The output signal is then directed to an appropriate or selected logic circuit (not shown), such as a microcontroller, amplifier circuit, comparator, etc.

In some embodiments, the emitters 48 and receivers 44 may be provided as a single sensor. That is, at least one sensor for emitting and receiving radiation may be provided on the bottom wall of the lower side 26 of the housing 12. For example, in an embodiment, the at least one sensor comprises a single device that alternates between operating in a forward bias mode to emit radiation and a reverse bias mode to detect radiation. In some embodiments, the at least one sensor comprises one or more LEDs. In some embodiments, the at least one sensor mounted to the bottom wall is flush with the bottom wall. For example, the emitter 48a may act as either an independent emitter or a single device used for emitting and detecting radiation. In some embodiments where the at least one sensor is a single device (such as an LED), the at least one sensor is provided within the shredder housing 12 behind a protective surface, such as a sensor window 38 as illustrated in FIG. 2. In this way, the single device or LED is less susceptible to false readings or errors due to dust and particles, for example. Additionally, using a single device such as an LED provides additional benefits such as cost reduction (e.g., using only a single device), a controllable input, as well as the potential to provide multiple and/or redundant sensors while still reducing the costs.

When using LEDs as sensing devices, the LEDs can detect the presence or absence of shredded materials in the bin 18 in a similar manner as described above. However, the circuitry and/or logic to determine the intensity readings of the reflected radiation used with LEDs may act in a different manner. Specifically, the change in intensity is directly proportional to the amount of shredded materials in the bin. That is, if a decrease or an increase in intensity is determined, a decrease or an increase in the amount of shredded materials in the bin 18 is detected. Specifically, when using LEDs as emitting and receiving sensing devices, a decrease in the intensity of the reflected radiation corresponds to a decrease in the amount of shredded material deposited in the bin, as shown in FIG. 8. In contrast, as illustrated in FIG. 9, an increase in the intensity of the reflected radiation detected by the LEDs corresponds to an increase in the amount of shredded material deposited in the bin.

Figure 12:
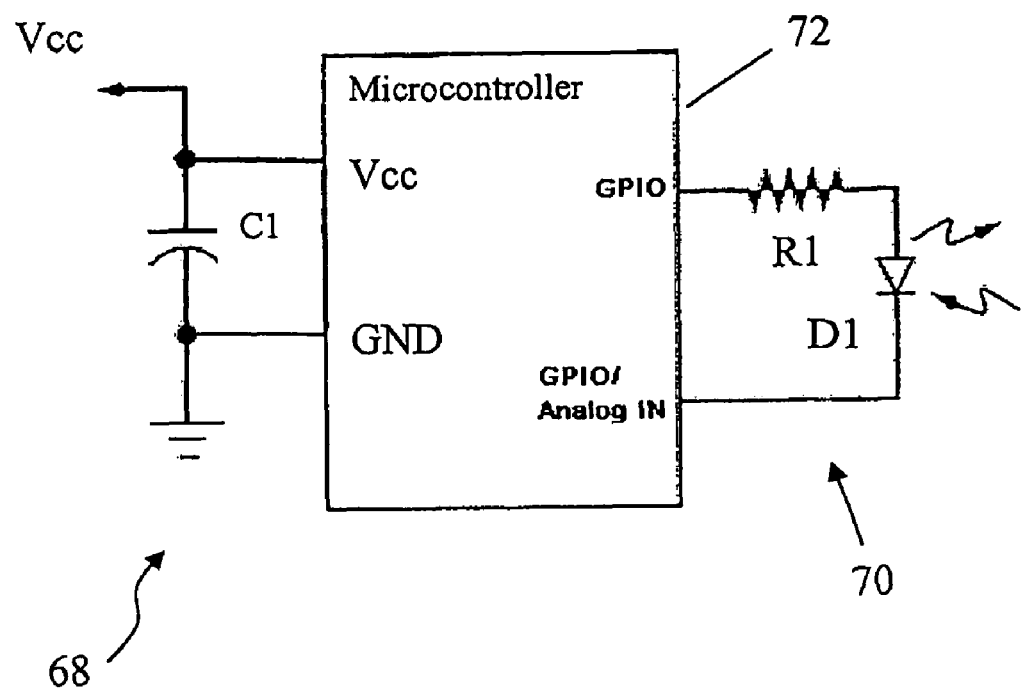
FIG. 12 shows a circuit which may be used to detect emitted light using a single device as an emitter and receiver in accordance with an embodiment of the present invention.

For example, the bin detection system 32 may comprise an emitted radiation level detection circuit 68 as illustrated in FIG. 12. The circuit 68 of FIG. 12 comprises an LED 70 as a single device for emitting and detecting radiation. The LED 70 is connected across the pins of the microcontroller 72. There is an optional series resistor R1 shown with the LED 70 to limit the current through the LED 70. The microcontroller 72 is responsible for alternating the bias of the LED 70 and reading the analog voltage produced. The microcontroller 72 first forward biases the LED 70 to turn the light on. After a predetermined amount of time, the microcontroller 72 may then reverse bias the LED 70 to act as a photo diode. After another predetermined amount of time, the microcontroller reads the voltage across the device. Because there is intrinsic resistance and capacitance in the components, the RC time constant of the device allows the single component to detect the light it produced being reflected towards it.

The bin level detection systems 32 or 58 described herein provide detection devices with a cost-effective way of alerting a user when the bin 18 is nearing or is substantially reached its capacity (i.e., is full) of shredded material. The systems assist in indicating the amount of shredded material in the bin 18 with improved accuracy over previous methods. Also, the bin level detection systems 32 or 58 provide feedback to users showing a measured level of shreds in the bin 18. Reflected radiation in the form of ambient light or emitted light received by the sensors 34, 44, and/or 48 allows for monitoring of the intensity of the radiation within the bin 18 and indicates via level indicator system 54 the amount of shredded materials or fullness of the bin. Sensing reflected radiation using the herein described sensors that are protected by windows 38 and 50 aid in reducing the sensitivity of the bin level detection system typically associated with the prior art, such as the collection of dust and stray shreds which could produce malfunctions or false signals. The described systems 32 and 58 according to various embodiments of the present invention also improve on prior mechanical bin full systems as there are no protruding mechanical parts, thus preventing shredded materials from building up on a switch and/or bird nesting below the cutter elements 21 or output opening 16.

Figure 10:
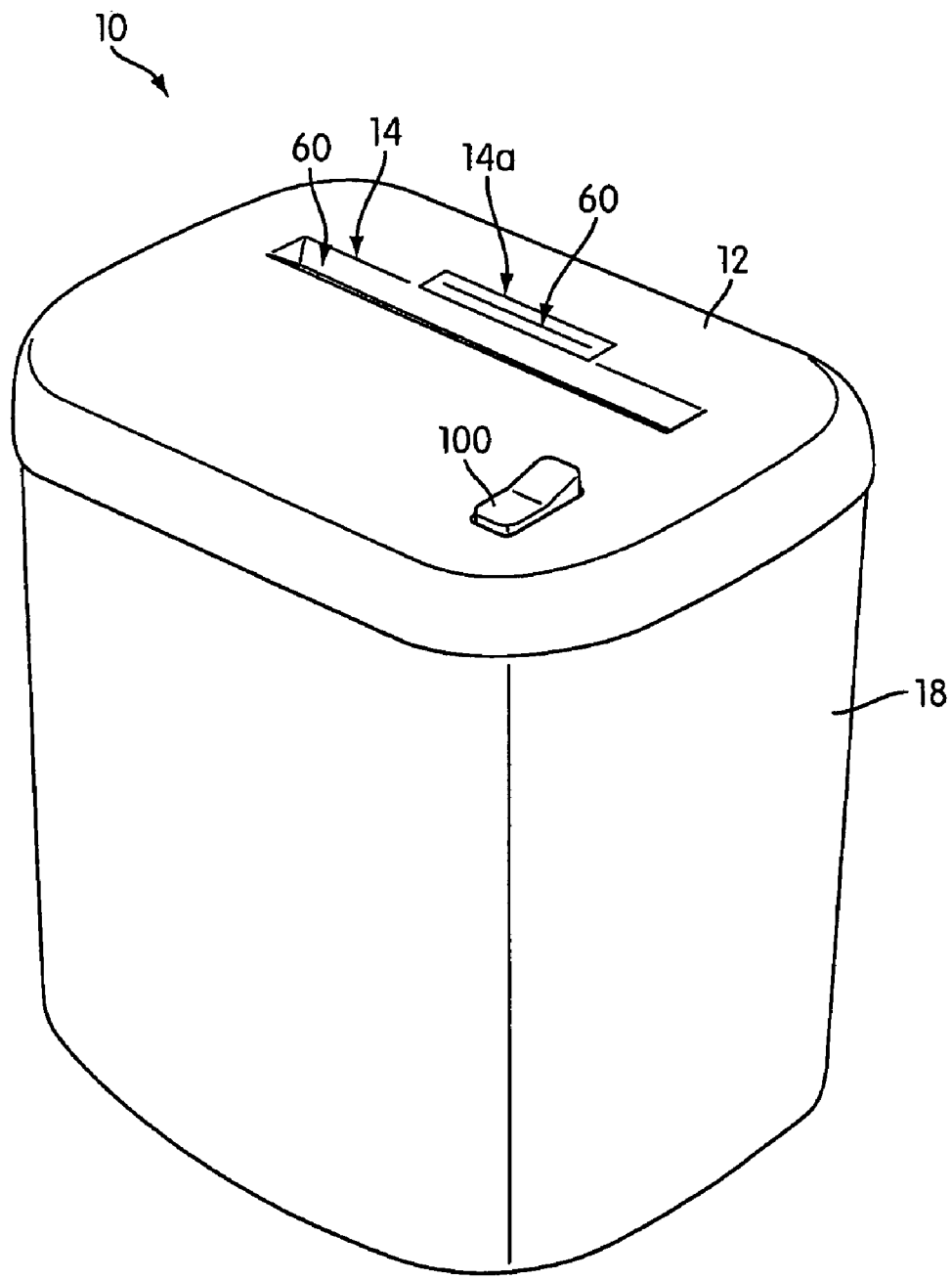
FIG. 10 illustrates a top perspective view of a shredder apparatus with a bin level detection system having a sensor operable to detect the presence of article(s) to be shredded by the shredder in accordance with an embodiment of the present invention.

The bin level detection systems 32 or 58 described herein may be used with any number of systems or devices known in the art associated with shredders 10. As previously noted, in addition or alternatively to indicator 54 discussed above, an activation sensor 60 may also be provided on shredder 10. The sensor 60 may communicate with the motor 18 to power the shredder mechanism 20 via the controller. Activation sensor 60 may be operable to detect the presence of article(s) to be shredded by the shredder 10. Activation sensor 60 may be placed in, adjacent, or near the throat 14 or 14a, as illustrated in FIG. 10. Activation sensor 60 may include an infrared sensor or a light emitting diode (LED), for example. The sensor may detect the presence of an article in throat 14 or 14a. Of course, any such sensor may be used. The illustrated embodiment is not intended to be limiting in any way. The sensor 60 provides a signal to the controller which in turn may provide a signal to the motor. Specifically, the controller may control whether power is provided to the motor so that the shafts may rotate the cutter elements 21 and shred the article(s) inserted into throat 14 or 14a. If the bin level sensing systems 32 or 58 detect that the bin 18 is full of shredded materials, however, power will not be provided to the shredder mechanism 20, thereby making the shredder 10 temporarily inoperable, even though the sensor 60 has detected the presence of an article to be shredded. This not only protects the motor 18, but it also provides an additional feature for preventing jamming of articles in the output opening 16 or materials getting caught within the cutter elements 21 of the shredder mechanism 20.

In some embodiments, the sensors of the bin level detection system 32 may be provided to work in cooperation with proximity sensors. For example, a proximity or capacitive sensor, acting as a switch that detects the presence of a person or thing without requiring physical contact, may be provided on shredder housing 12. Such sensors may assist in preventing harm or injury to a user.

In an embodiment, the controller may include logic for compensating for the decreasing in the intensity of the emitters 48 or sensors 48a (e.g., such as LED(s) or infrared devices) by calibrating and/or recalibrating the sensors periodically. Calibrating the emitters 48 or sensors 48a may assist in preventing false positive signals being sent from the controller to the shredder mechanism 20, as well as increase the life the emitters 48 and/or sensors 48a. In addition, the controller 56 may be used to distinguish between false errors from ambient light 40.

Also, though the bin level detection systems 32 and 58 are described herein as being associated with a shredder 10, the systems 32 and 58 may alternatively be used with a variety of other assemblies that include a bin for receiving material (e.g., waste can, dumpster, recycling container, storage container for various goods). For example, in an embodiment, an assembly may comprise a bin such as bin 18 and any of the bin level detection systems as described above, i.e., comprising at least one sensor positioned to receive radiation reflected off any material deposited in the bin and determine an intensity of the reflected radiation, the intensity corresponding to an amount of material deposited in the bin.

In various of the illustrated embodiment, the bin level detection systems are used to indicate when the bin becomes full in an environment where use of the bin causes it to fill with material. However, according to alternative embodiments of the present invention, the bin level detection systems are used to indicate when a bin becomes empty, for example in an assembly in which the amount of material in the bin decreases with use (e.g., a storage bin that automatically feeds its stored material for use; a candy or other food dispenser having a storage bin; a plastic bead storage bin attached to an automatic feed assembly for feeding the plastic beads into a plastic mold; etc.).

In some embodiments, any of the sensors 34, receivers 44, 44a, emitters 48, 48a, 48b, or windows 26, 38, or 50 may be provided in any number of locations on or in the assembly or the shredder 10. For example, such locations may include a lower side 26 or bottom wall of the shredder housing 12, one or more side walls of the bin 18, on the bin 18 adjacent the lip 30, or any other location that allows for emitting and/or detecting radiation that is reflected off of material in the bin 18. Nonetheless, the areas for and method of mounting the noted devices should not be limiting.

Additionally, it should be noted that the directions of receiving ambient light or emitted light should not be limited to those illustrated in FIGS. 4-5 and/or FIGS. 8-9. Generally, the radiation or light may be received and/or emitted in any number of directions. The radiation may also be deflected in any number of ways within the container 18 and the noted illustrations should not be limiting.

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A shredder assembly comprising:
    a bin for receiving material;
    a shredder housing having a shredder mechanism mounted therein, the shredder housing being connected to the bin and comprising an input opening for receiving materials to be shredded and an output opening for depositing shredded material into the bin, and
    a bin level detection system comprising:
        at least one sensor for receiving scattered radiation within the bin and to determine an intensity of the scattered radiation, the intensity corresponding to an amount of material deposited in the bin.

2. The shredder assembly according to claim 1, wherein the input opening is provided on an upper side of the shredder housing.

3. The shredder assembly according to claim 1, wherein the output opening is provided on a lower side of the shredder housing.

4. The shredder assembly according to claim 1, wherein the at least one sensor further comprises a plurality of receivers for receiving at least the scattered radiation within the bin.

5. The shredder assembly according to claim 4, wherein the bin level detection system further comprises at least one emitter for emitting radiation into the bin such that the radiation is scattered within the bin for receipt by the receivers.

6. The shredder assembly according to claim 5, wherein the at least one emitter comprises a plurality of spaced apart emitters.

7. The shredder assembly according to claim 6, wherein the shredder housing has a bottom wall with the output opening thereon, the emitters including one or more emitters mounted to the bottom wall.

8. The shredder assembly according to claim 7, wherein the one or more emitters mounted to the bottom wall are flush with the bottom wall.

9. The shredder assembly according to claim 7, wherein the one or more emitters are provided on structures extending downwardly from the bottom wall.

10. The shredder assembly according to claim 9, wherein structures extending downwardly from the bottom wall are springs.

11. The shredder assembly according to claim 5, wherein the receivers comprise a plurality of receivers arranged in spaced apart relation.

12. The shredder assembly according to claim 11, wherein the shredder housing has a bottom wall with the output opening thereon, and wherein at least one receiver of the plurality of receivers is mounted to the bottom wall.

13. The shredder assembly according to claim 12, wherein the at least one receiver mounted to the bottom wall is flush with the bottom wall.

14. The shredder assembly according to claim 5, wherein the radiation emitted by the at least one emitter is selected from a group consisting of light in the visible spectrum, infrared radiation, and ultraviolet radiation.

15. The shredder assembly according to claim 1, wherein the at least one sensor comprises a single device that alternates between operating in a forward bias mode to emit radiation and a reverse bias mode to detect radiation.

16. The shredder assembly according to claim 1, wherein the at least one sensor comprises one or more light emitting diodes.

17. The shredder assembly according to claim 1, wherein the at least one sensor is constructed and arranged to sense scattered radiation selected from a group consisting of: light in the visible spectrum, infrared radiation, and ultraviolet radiation.

18. The shredder assembly according to claim 1, further comprising at least one opening for permitting ambient light from an outside source constituting radiation to enter the bin and reflect within the bin for receipt and detection by the at least one sensor.

19. The shredder assembly according to claim 18, wherein the at least one opening is selected from the group consisting of: a through opening, a substantially transparent window, or a substantially translucent window.

20. The shredder assembly according to claim 18, wherein the at least one sensor comprises a plurality of receivers arranged in spaced apart relation.

21. The shredder assembly according to claim 20, wherein the shredder housing has a bottom wall with the output opening thereon, and wherein at least one receiver of the plurality of receivers is mounted to the bottom wall.

22. The shredder assembly according to claim 21, wherein the at least one receiver mounted to the bottom wall is flush with the bottom wall.

23. The shredder assembly according to claim 1, further comprising a level indicator system to indicate to a user of the assembly the amount of material deposited in the bin.

24. The shredder assembly according to claim 23, wherein the level indicator system is a progressive indicator comprising a plurality of lights which correspond to the amount of material deposited in the bin.

25. The shredder assembly according to claim 24, wherein the plurality of lights comprise a plurality of colors, and wherein each color indicates a different amount of material deposited in the bin.

26. The shredder assembly according to claim 23, wherein the level indicator system includes a device for alerting the user via signals selected from the group of audible signals, visual signals, or a combination of audible and visual signals.

27. The shredder assembly according to claim 1, wherein the at least one sensor is positioned on a side wall of the bin.

28. A shredder assembly comprising:
- a bin for receiving shredded material, the bin comprising at least one opening in one or more walls of the bin, the at least one opening allowing ambient light from an outside source to enter the bin;
- a shredder housing connected to the bin, the shredder housing comprising an input opening for receiving materials to be shredded, a shredder mechanism mounted therein, and an output opening for depositing shredded material into the bin, and
- a bin level detection system comprising:
    - at least one sensor for detecting at least ambient light from the outside source, and
    - a controller configured to determine an intensity of the ambient light scattered within the bin, the intensity corresponding to an amount of material deposited in the bin.

29. The shredder assembly according to claim 28, wherein the at least one opening comprises one from the group consisting of: a through opening, a substantially transparent window, or a substantially translucent window.

30. The shredder assembly according to claim 28, wherein the at least one sensor is positioned on the shredder housing and/or on the one or more walls of the bin.

31. The shredder assembly according to claim 28, wherein the shredder housing has a bottom wall with the output opening thereon, and wherein the at least one sensor is mounted to the bottom wall.

32. The shredder assembly according to claim 28, wherein the at least one sensor is positioned on a side wall of the bin.

33. The shredder assembly according to claim 28, wherein the at least one sensor further comprises one or more receivers for receiving at least the ambient light.

34. The shredder assembly according to claim 28, wherein the at least one sensor comprises a single device that alternates between operating in a forward bias mode to emit radiation and a reverse bias mode to detect radiation.

35. The shredder assembly according to claim 28, wherein the at least one sensor comprises one or more light emitting diodes.

36. The shredder assembly according to claim 28, wherein the at least one sensor is constructed and arranged to sense radiation selected from a group consisting of: light in the visible spectrum, infrared radiation, and ultraviolet radiation.

37. The shredder assembly according to claim 14, further comprising at least one area for permitting ambient light from an outside source constituting radiation to enter the bin and reflect within the bin for receipt and detection by the receivers.

38. The shredder assembly according to claim 37, wherein the at least one area allows for viewing any light in the visible spectrum and any shredded material within the bin.

39. The shredder assembly according to claim 36, wherein the at least one opening allows for viewing any light in the visible spectrum and any shredded material within the bin.

40. The shredder assembly according to claim 28, further comprising a level indicator system comprising a plurality of colored lights which indicate to a user of the assembly the amount of material deposited in the bin, and wherein each color indicates a different amount of material deposited in the bin.

* * * * *